United States Patent
Kim et al.

(10) Patent No.: US 11,308,650 B2
(45) Date of Patent: Apr. 19, 2022

(54) DISPLAY APPARATUS, IMAGE PROVIDING APPARATUS, AND METHODS OF CONTROLLING THE SAME

(71) Applicant: SAMSUNG ELECTRONICS CO., LTD., Suwon-si (KR)

(72) Inventors: Doohyun Kim, Suwon-si (KR); Minyong Sung, Suwon-si (KR); Sangkwon Na, Suwon-si (KR); Kiwon Yoo, Suwon-si (KR); Sangjo Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 25 days.

(21) Appl. No.: 16/730,291

(22) Filed: Dec. 30, 2019

(65) Prior Publication Data

US 2020/0219291 A1    Jul. 9, 2020

(30) Foreign Application Priority Data

Jan. 3, 2019  (KR) .................. 10-2019-0000518

(51) Int. Cl.
*G06T 9/00*      (2006.01)
*H04N 19/136*   (2014.01)
*H04N 19/184*   (2014.01)
*H04N 19/196*   (2014.01)
(Continued)

(52) U.S. Cl.
CPC .......... *G06T 9/002* (2013.01); *H04N 19/136* (2014.11); *H04N 19/184* (2014.11); *H04N 19/196* (2014.11); *H04N 19/20* (2014.11); *H04N 19/85* (2014.11)

(58) Field of Classification Search
CPC .... G06T 9/002; H04N 19/136; H04N 19/184; H04N 19/196; H04N 19/20; H04N 19/85; H04N 19/86
See application file for complete search history.

(56) References Cited

U.S. PATENT DOCUMENTS

| | | |
|---|---|---|
| 5,214,746 A | 5/1993 | Fogel et al. |
| 9,811,882 B2 | 11/2017 | Lee et al. |
| 2008/0097942 A1 | 4/2008 | Zhao et al. |

(Continued)

FOREIGN PATENT DOCUMENTS

| | | | |
|---|---|---|---|
| KR | 10-2016-0038683 A | | 4/2016 |
| KR | 20160038683 | * | 4/2016 |

(Continued)

OTHER PUBLICATIONS

Communication dated Jul. 31, 2020, from the European Patent Office in counterpart European Application No. 20150014.7.

(Continued)

*Primary Examiner* — Kathleen V Nguyen
(74) *Attorney, Agent, or Firm* — Sughrue Mion, PLLC

(57) ABSTRACT

Disclosed are a display apparatus, an image providing apparatus, and methods of controlling the same, the display apparatus including: a display; and a processor configured to: decode an encoded video stream, decompress the video stream through a neural network including a plurality of channels and a plurality of layers with a parameter set based on learning, and perform image compensation determined based on learning about the decompression with respect to the video stream.

18 Claims, 8 Drawing Sheets

(51) Int. Cl.
H04N 19/20 (2014.01)
H04N 19/85 (2014.01)

(56) References Cited

U.S. PATENT DOCUMENTS

| | | | | |
|---|---|---|---|---|
| 2010/0278231 A1* | 11/2010 | Gutman | ............... | H04N 19/172 |
| | | | | 375/240.02 |
| 2018/0260695 A1 | 9/2018 | Majumdar et al. | | |
| 2018/0342045 A1* | 11/2018 | Lutz | .......................... | G06N 3/08 |
| 2019/0075301 A1* | 3/2019 | Chou | ................... | H04N 19/132 |

FOREIGN PATENT DOCUMENTS

| | | | |
|---|---|---|---|
| KR | 10-2018-0100976 A | | 9/2018 |
| KR | 20180100976 | * | 9/2018 |
| KR | 10-2018-0119753 A | | 11/2018 |
| WO | 2017048389 A1 | | 3/2017 |

OTHER PUBLICATIONS

International Search Report and Written Opinion (PCT/ISA/210 and PCT/ISA/237), dated Apr. 24, 2020 by International Searching Authority in International Application No. PCT/KR2019/018612.

* cited by examiner

DISPLAY APPARATUS, IMAGE PROVIDING APPARATUS, AND METHODS OF CONTROLLING THE SAME

CROSS-REFERENCE TO RELATED THE APPLICATION

This application is based on and claims priority under 35 U.S.C. § 119 to Korean Patent Application No. 10-2019-0000518 filed on Jan. 3, 2019 in the Korean Intellectual Property Office, the disclosure of which is incorporated by reference herein in its entirety.

BACKGROUND

Field

Apparatuses and methods consistent with the exemplary embodiments relate to a display apparatus, an image providing apparatus, and methods of controlling the same, and more particularly to a display apparatus, an image providing apparatus, and methods of controlling the same, in which an image signal is processed based on artificial intelligence (AI) learning.

Description of the Related Art

An artificial intelligence (AI) system refers to a computer system that has an intellectual ability of a human level, and also refers to a system that becomes smarter through self-machine learning and identification on the contrary to a conventional rule-based smart system. The AI system is more improved in a recognition rate and more accurately learns a user's preference as it is used more and more, and therefore the conventional rule-based smart system has been gradually replaced by the AI system based on AI learning.

AI technology includes machine learning, deep learning and the like learning-based processes, and elementary technologies using the learning.

The learning refers to algorithm technology that autonomously sorts/learns features of input data, and the elementary technology refers technology that uses the machine learning, deep learning and the like learning algorithm to mimic functions of a human brain such as recognition, determination, etc. and is classified into technical fields including language understanding, visual understanding, inference/prediction, knowledge representation, operation control, etc.

Various fields to which the AI technology is applied are as follows. The language understanding refers to technology that recognizes and applies/processes a human language/character, and includes natural language processing, machine translation, a dialog system, question and answer, voice recognition/synthesis, etc. The visual understanding refers to technology that recognizes and processes an object like human vision, and includes object recognition, object tracking, image search, human recognition, scene understanding, space understanding, image enhancement, etc. The inference/prediction refers to technology that and logically makes inference and prediction by identifying and includes knowledge/probability-based inference, optimization prediction, preference-based plan, recommendation, etc. The knowledge representation refers to technology that automatically processes human experience information into knowledge data, and includes knowledge construction (data generation/classification), knowledge management (data utilization), etc. The operation control refers to technology that controls automatic driving of a vehicle and motion of a robot, and includes motion control (e.g. navigation, collision, driving), operation control (e.g. action control), etc.

As interest in the AI technology is rising, this technology has been applied as embedded in a television (TV), a terminal such as a smartphone, and the like products, and attempted to operate in an on-device environment.

Even in an imaging field, an image process using a neural network of a multi-layered structure has gradually become widespread as the AI technology.

Generally, a learning efficiency becomes higher as the multi-layered neural network has more layers and channels, thereby improving reliability of learning results.

However, when the AI technology operates in the on-device environment, resources are restricted as compared with those of when the AI technology operates in a separate server, and therefore it may be difficult to use as many layers and channels as needed for building up the neural network.

Accordingly, when enough layers and channels are not ensured in the neural network, learning is insufficiently carried out and it is thus difficult to get reliability of output as desired.

SUMMARY

Provided herein is a display apparatus including a display; and a processor configured to: decode an encoded video stream to produce a decoded video stream, wherein the decoded video stream includes a first image, decompress the decoded video stream through a neural network, wherein the neural network comprises a plurality of channels and a plurality of layers, wherein the neural network is configured to operate with a parameter set, wherein the parameter set is based on a learning operation, and perform an image compensation, wherein the image compensation is determined based on the learning operation with respect to the decoded video stream.

In some embodiments of the display apparatus, the image compensation is at least one of preprocessing or postprocessing.

In some embodiments of the display apparatus, the processor is further configured to identify features of a first image to produce identified features, and determine whether to perform the preprocessing or the postprocessing with regard to the first image based on the identified features.

In some embodiments of the display apparatus, the processor is further configured to obtain, from the decoded video stream, a flag, wherein the flag is configured to indicate whether the preprocessing or the postprocessing is to be performed.

In some embodiments of the display apparatus, the processor is further configured to determine whether to perform the preprocessing or the postprocessing, based on one among a frame unit, a block unit and a pixel unit of a first image.

In some embodiments of the display apparatus, the image compensation comprises at least one of dejagging, decontouring, or deblurring.

In some embodiments of the display apparatus, the processor is further configured to evaluate an output performance of the neural network based on the learning operation, to produce an evaluation, and perform the image compensation by adjusting a configuration of the neural network based on a result of the evaluation.

Also provided herein is an image providing apparatus comprising a processor configured to compress an input image through a neural network, wherein the neural network comprises a plurality of channels and a plurality of layers, wherein the neural network is configured to operate with a parameter set, wherein the parameter set is based on a learning operation, and perform an image compensation, wherein the image compensation is determined based on the learning operation with respect to the input image, and generate a video stream by encoding the input image; and data interface circuitry configured to output the encoded video stream.

In some embodiments of the image providing apparatus, the image compensation as at least one of preprocessing or postprocessing.

In some embodiments of the image providing apparatus, the video stream comprises a flag indicating whether second preprocessing or second postprocessing is to be performed in a display apparatus configured to decode the video stream.

In some embodiments of the image providing apparatus, the image compensation comprises noise making, and wherein the noise making is configured to compensate for at least one of jagging, contouring, or blurring.

In some embodiments of the image providing apparatus, the processor is further configured to evaluate an output performance of the neural network based on the learning operation to produce an evaluation result, and perform the image compensation by adjusting a configuration of the neural network based on the evaluation result.

Also provided herein is a method of controlling a display apparatus, comprising: decoding an encoded video stream to produce a decoded video stream, wherein the decoded video stream includes a first image; decompressing the decoded video stream through a neural network, wherein the neural network comprises a plurality of channels and a plurality of layers, wherein the neural network is configured to operate with a plurality of parameters, wherein the parameter set is based on a learning operation; and performing an image compensation, wherein the image compensation is determined based on the learning operation with respect to the decoded video stream.

In some embodiments of the method of controlling a display apparatus, the image compensation is at least one of preprocessing or postprocessing.

In some embodiments of the method of controlling a display apparatus also includes identifying features of a first image to produce identified features; and determining whether to perform the preprocessing or the postprocessing with regard to the first image based on the identified features.

In some embodiments of the method of controlling a display apparatus also includes obtaining, from the decoded video stream, a flag, wherein the flag is configured to indicate whether the preprocessing or the postprocessing is to be performed.

In some embodiments of the method of controlling a display apparatus, the image compensation comprises at least one of dejagging, decontouring, or deblurring.

Also provided is a method of controlling an image providing apparatus, including compressing an input image through a neural network, wherein the neural network comprises a plurality of channels and a plurality of layers, wherein the neural network is configured to operate with a plurality of parameters, wherein the parameter set is based on a learning operation; performing an image compensation, wherein the image compensation is determined based on the learning operation with respect to the input image; and generating an encoded video stream by encoding the input image; and outputting the encoded video stream.

In some embodiments of the method of controlling an image providing apparatus, the image compensation is at least one of preprocessing or postprocessing.

In some embodiments of the method of controlling an image providing apparatus, the performing of the image compensation comprises making noise, and wherein the noise making is configured to compensate for at least one of jagging, contouring, or blurring.

According to an embodiment, there is provided a display apparatus including: a display; and a processor configured to: decode an encoded video stream, decompress the video stream through a neural network including a plurality of channels and a plurality of layers with a parameter set based on learning, and perform image compensation determined based on learning about the decompression with respect to the video stream.

The processor may perform the image compensation as at least one of preprocessing or postprocessing for the decompression.

The processor may identify features of an image corresponding to the decoded video stream, and may identify whether to perform the preprocessing or the postprocessing with regard to the image based on the identified features.

The processor may identify a flag indicating whether the preprocessing or the postprocessing should be performed from the video stream, and may identify whether to perform the preprocessing or the postprocessing with regard to the image, based on the identification.

The processor may identify whether to perform the preprocessing or the postprocessing, based on one among a frame unit, a block unit and a pixel unit of an image.

The image compensation may include at least one of dejagging, decontouring, or deblurring.

The processor may evaluate output performance of the neural network based on learning about the neural network, and may perform the image compensation by adjusting a configuration of the neural network based on a result of the evaluation.

According to an embodiment, there is provided an image providing apparatus including: a processor configured to: compress an input image through a neural network including a plurality of channels and a plurality of layers with a parameter set based on learning, and perform image compensation determined based on learning about the compression with respect to the input image, and generate a video stream by encoding the input image; and an output unit configured to output the encoded video stream to an outside.

The processor may perform the image compensation as at least one of preprocessing or postprocessing for the compression.

The output video stream may include a flag indicating whether preprocessing or postprocessing should be performed, which is needed for the image compensation when the video stream is decoded in a display apparatus.

The image compensation may include noise making to compensate for at least one of jagging, contouring, or blurring.

The processor may evaluate output performance of the neural network based on learning about the neural network, and may perform the image compensation by adjusting a configuration of the neural network based on a result of the evaluation.

According to an embodiment, there is provided a method of controlling a display apparatus, including: decoding an encoded video stream; decompressing the video stream with a parameter set based on learning through a neural network including a plurality of channels and a plurality of layers;

and performing image compensation determined based on learning about the decompression with respect to the video stream.

The performing of the image compensation may include performing the image compensation as at least one of preprocessing or postprocessing for the decompression.

The method may further include: identifying features of an image corresponding to the decoded video stream; and identifying whether to perform the preprocessing or the postprocessing with regard to the image based on the identified features.

The method may further include: identifying a flag indicating whether the preprocessing or the postprocessing should be performed from the video stream; and identifying whether to perform the preprocessing or the postprocessing with regard to the image, based on the identification.

The image compensation may include at least one of dejagging, decontouring, or deblurring.

According to an embodiment, there is provided a method of controlling an image providing apparatus, including: compressing an input image with a parameter set based on learning through a neural network including a plurality of channels and a plurality of layers; performing image compensation determined based on learning about the compression with respect to the input image; and generating a video stream by encoding the input image; and outputting the encoded video stream to an outside.

The performing of the image compensation may include performing the image compensation as at least one of preprocessing or postprocessing for the compression.

The performing of the image compensation may include making noise to compensate for at least one of jagging, contouring, or blurring.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
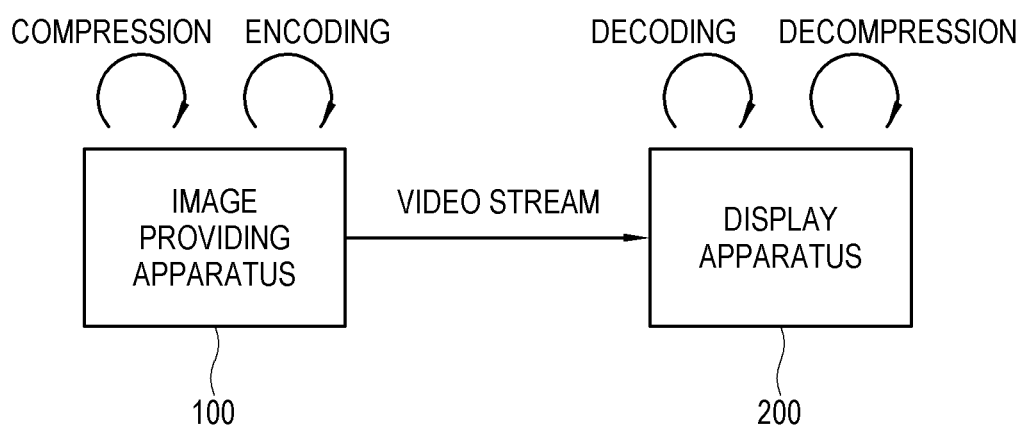
FIG. 1 illustrates a system including an image providing apparatus and a display apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide a display apparatus, an image providing apparatus, and methods of controlling the same, which can compensate for distortion caused as learning is insufficiently carried out by restricted resources when an image is processed based on artificial intelligence (AI) learning in an on-device environment.

FIG. 1 illustrates a system including an image providing apparatus and a display apparatus according to an embodiment of the disclosure.

According to an embodiment of the disclosure, content may be provided from an image providing apparatus 100 to a display apparatus 200.

The image providing apparatus 100 may, as shown in FIG. 1, provide content as a compressed and encoded video stream.

There are no limits to the kinds of content provided by the image providing apparatus 100, and the content may for example include broadcast content, media content, an application, etc. According to an embodiment, media content may be provided as a video stream having a format of a file streamed in real time through a network, in the form of a video on demand (VOD) service.

There are no limits to the kinds of image providing apparatus 100, and the image providing apparatus 100 may include a broadcasting station, a media business operator, a service provider, a system integrator (SI), an application market, a website, or the like various servers.

The display apparatus 200 decodes and decompresses the video stream received from the image providing apparatus 100 to thereby display a corresponding image.

According to an embodiment, the display apparatus 200 may be embodied in a television (TV) that processes a broadcast content based on at least one of a broadcast signal, broadcast information or broadcast data from a transmitter of a broadcasting station.

The display apparatus 200 may for example wirelessly receive a radio frequency (RF) signal, i.e. broadcast content from the broadcasting station. To this end, the display apparatus 200 may include an antenna configured to receive a signal, and a tuner configured to be tuned to a channel corresponding to a broadcast signal.

The display apparatus 200 may receive broadcast content through a terrestrial wave, a cable, a satellite, etc., and a signal source is not limited to the broadcasting station. In other words, the signal source of the disclosure may include any apparatus or station capable of transceiving or relaying data, like a set-top box. Further, the display apparatus 200 may receive content from a player for reproducing an optical disc such as a Blu-ray disc (BD), a digital versatile disc (DVD), etc.

Standards for a signal received in the display apparatus 200 may be variously given corresponding to the types of the apparatus, and content may for example be received based on a high definition multimedia interface (HDMI), a display port (DP), a digital visual interface (DVI), composite video, component video, super video, Syndicat des Constructeurs d'Appareils Radiorécepteurs et Téléviseurs (SCART), universal serial bus (USB), etc. by a wire.

The display apparatus 200 may receive content from a server or the like through wired or wireless network communication, and there are no limits to the kinds of communication.

According to an embodiment, the display apparatus 200 may perform at least one of wireless communication using an access point (AP) or wireless communication directly connected to other apparatuses without the AP. For example, the display apparatus 200 may receive content from an image providing apparatus 100 through the wireless network communication such as Wi-Fi, Wi-Fi Direct, Bluetooth, Bluetooth low energy, Zigbee, Ultra-Wideband (UWB), near field communication (NFC), etc. Alternatively, the display apparatus 200 may receive content through Ethernet or the like wired network communication.

Further, according to an embodiment, the display apparatus 200 may serve as the AP through which various peripheral devices such as a smartphone can perform the wireless communication.

Further, the display apparatus 200 may perform a signal process to display thereon a moving image, a still image, an application, an on-screen display (OSD), a user interface (UI, hereinafter also referred to as a graphic user interface (GUI)) for various operation controls, etc. based on a signal/data stored in an internal/external storage medium.

According to an embodiment, the display apparatus 200 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

However, the display apparatus 200 of the disclosure is not limited to the TV, and may for example be embodied in the form of a mobile device or a terminal capable of displaying an image by decoding and decompressing a video stream like a smartphone or a smart pad such as a tablet computer.

Below, operation of encoding and decoding an image will be described with reference to the accompanying drawings.

Figure 2:
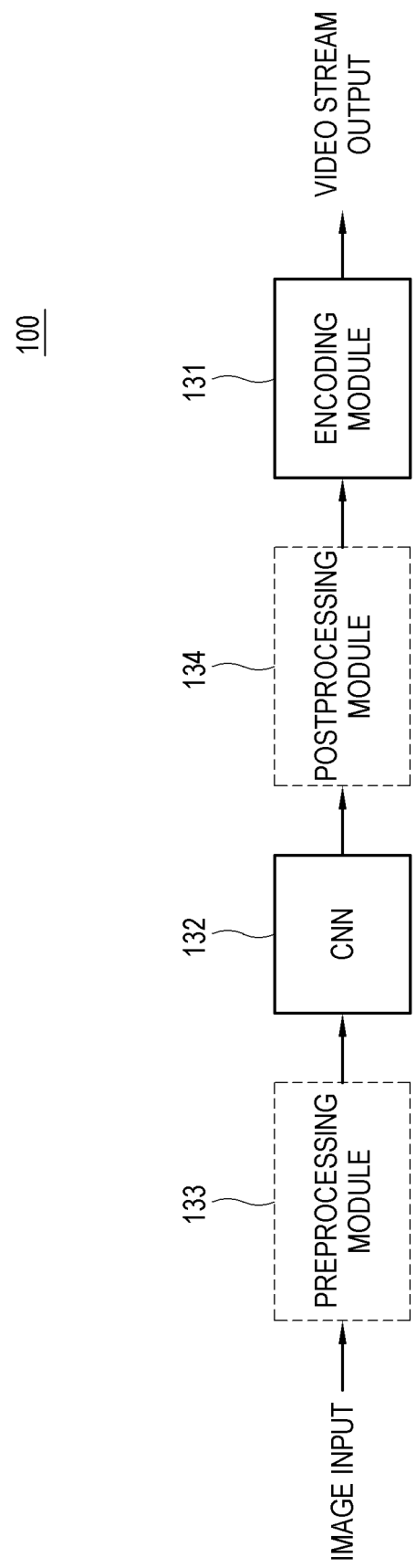
FIG. 2 illustrates operation of an image providing apparatus according to an embodiment of the disclosure.

FIG. 2 illustrates operation of an image providing apparatus according to an embodiment of the disclosure.

The image providing apparatus 100 may include an encoding module 131 (hereinafter also referred to as an encoder) for encoding an input image and outputting a bit stream, i.e. a video stream.

In the image providing apparatus 100 according to an embodiment of the disclosure, the encoding module 131 may be embodied by an encoder complying with moving picture experts group (MPEG), H.264, high efficiency video codec (HEVC), or the like various compression standards, i.e. codec.

The image providing apparatus 100 according to an embodiment of the disclosure, as shown in FIG. 2, includes a convolution neural network (CNN) 132 that processes an input image and outputs the processed image to the encoding module 131.

The CNN 132 (hereinafter also referred to as an encoding neural network) refers to a kind of artificial neural network (ANN) based on convolution, which includes a plurality of channels and a plurality of layers and is used to analyze a visual image.

In the image providing apparatus 100 according to an embodiment of the disclosure, the CNN 132 may be embodied to apply various image processes to an input image. Specifically, the CNN 132 may compress an input image. Basically, the compression of an image refers to that an original input image is analyzed and encoded by reducing duplicated information so that the display apparatus 200 can restore the image as close to the original as possible.

The CNN 132 may for example perform various compression processes, such as a compression process based on the size of an image, a compression process based on the number of bits corresponding to a pixel, etc., thereby outputting an image, the size of which is reduced from the original input image.

According to an embodiment, each layer of the CNN 132 may be configured by a filter that operates with a parameter set to have a preset value, i.e. weight based on machine learning, deep learning, and the like previously performed learning. The CNN 132 may compress an input image with the parameter set based on the learning as described above.

In the image providing apparatus 100 according to an embodiment of the disclosure, the CNN 132 is configured to operate as an on-device based AI.

The image providing apparatus 100 may, as shown in FIG. 2, include at least one of a preprocessing module 133 or the postprocessing module 134 to perform image compensation. Thus, the preprocessing or the postprocessing may be properly selected to perform the image compensation as necessary.

FIG. 2 shows an example that the image providing apparatus 100 includes both the preprocessing module 133 and the postprocessing module 134, but the disclosure is not limited to this example. According to an alternative example, the image providing apparatus 100 may include one of the preprocessing module 133 or the postprocessing module 134.

According to an embodiment of the disclosure, the image providing apparatus 100 may employ at least one of the preprocessing module 133 or the postprocessing module 134 to perform one or more image compensations based on learning about the compression performed in the CNN 132.

Thus, image quality is maintained by compensating for distortion of an image, which may occur while compressing the image.

Specifically, the image providing apparatus 100 finds a problem by learning the CNN 132 based on a predetermined algorithm, and uses at least one of the preprocessing module 133 or the postprocessing module 134 to perform the image compensation for the found problem.

There are no limits to the kinds of image compensation performed in the disclosure, and the image compensation may for example include at least one of jagging, contouring or blurring. Thus, it is possible to properly compensate for various types of image distortion.

According to an embodiment, the image providing apparatus 100 may include the preprocessing module 133 to perform contouring compensation with regard to an input image. Specifically, the preprocessing module 133 may make noise to previously prevent a contour artifact which may occur while the image compressed in the image providing apparatus 100 is decompressed in the display apparatus 200. Here, the noise made in the preprocessing module 133 is identified or determined based on the previously performed learning.

Alternatively, the image providing apparatus 100 may include the postprocessing module 134 to perform edge-blurring compensation with regard to an input image. The blurring refers to a technique of removing details of an image to blur or soften the image, and the postprocessing module 134 may for example previously compensate for distortion, which occurs while the edge blurring is carried out dividing an input image in units of block, based on the previously performed learning.

In the image providing apparatus 100 according to an embodiment, it may be identified corresponding to the kind of image compensation whether to perform the preprocessing or the postprocessing. For example, the contouring and the blurring may be determined to be performed by the postprocessing module 134, and the edge blurring may be determined to be performed by the preprocessing module 133.

According to an embodiment, the image providing apparatus 100 may include a hardware element, i.e. a video processor (hereinafter, also referred to as a processor), and the encoding module 131, the CNN 132, the preprocessing module 133 and the postprocessing module 134 described above may be provided as configurations of the video processor and distinguished by operations based on execution of software.

According to an alternative embodiment, the encoding module 131, the CNN 132, the preprocessing module 133 and the postprocessing module 134 may be respectively embodied as hardware elements, or may be distinguished by combination of hardware and software as necessary.

The video processor may be embodied as a video board that various chipsets, memories, electronic parts, wiring and the like circuitry elements for performing the processes as described above are mounted onto a printed circuit board (PCB).

According to an embodiment, the image providing apparatus 100 may include a storage (not shown) configured to store learning data for allowing the video processor to perform operation using a filter set with a value based on the previously performed learning, and learning data for finding a problem of the CNN 132.

The image providing apparatus 100 outputs a video stream, which is generated by making the encoding module 131 encode a signal, i.e. an input signal subjected to the compression and the compensation as described above, to the outside through an output unit (not shown). Here, the video stream output from the image providing apparatus 100 may include a flag indicating whether a predetermined image compensation should be performed (for example, whether the preprocessing or the postprocessing is on or off), which is needed when the corresponding video stream is decoded. Thus, it is easy to identify whether the image compensation should be performed.

The output unit is embodied as a circuitry that a circuitry including a data input/output interface where communication modules (an S/W module, a chip, etc.), ports, etc. are combined corresponding to predetermined communication protocols, and outputs an encoded video stream to the outside through a wired or wireless network.

FIG. 2 illustrates the configurations of the image providing apparatus 100 directly related to the image processing by way of example, but the configurations of the image providing apparatus 100 of the disclosure are not limited to this example. In other words, the image providing apparatus 100 may further include another configuration, e.g. a general-purpose processor such as a central processing unit (CPU) for generally controlling operations of the image providing apparatus 100, as well as the video processor, the storage and the output unit as described above.

The display apparatus 200 receives the encoded video stream output from the image providing apparatus 100 as described above.

Figure 3:
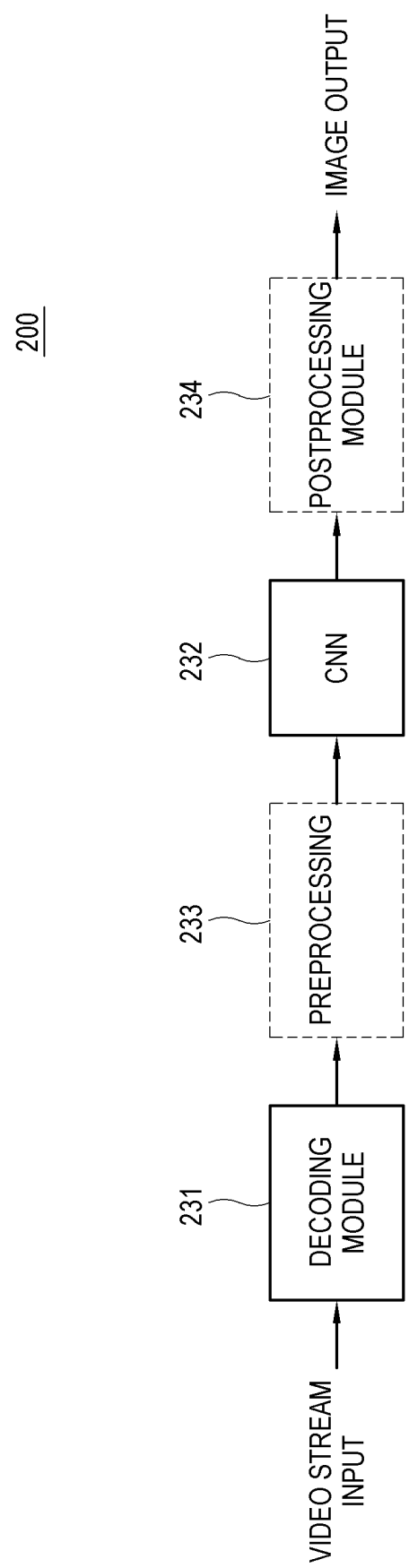
FIG. 3 illustrates operation of a display apparatus according to an embodiment of the disclosure.
Figure 4:
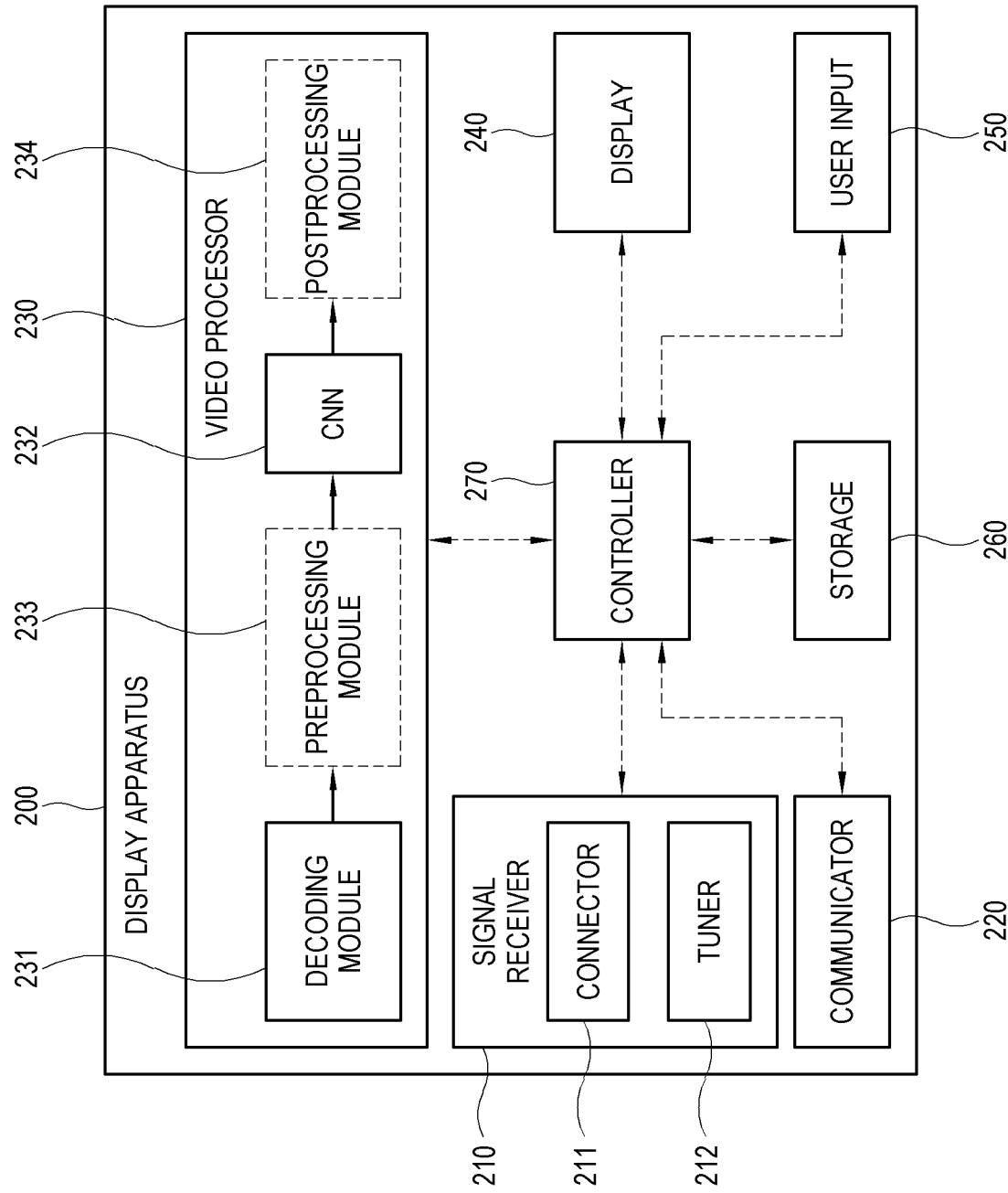
FIG. 4 is a block diagram of a display apparatus according to an embodiment of the disclosure.

FIG. 3 illustrates operation of a display apparatus according to an embodiment of the disclosure, and FIG. 4 is a block diagram of a display apparatus according to an embodiment of the disclosure.

The display apparatus 200 includes a decoding module 231 (hereinafter, also referred to as a decoder) that receives an encoded bit stream, i.e. video stream and decodes the encoded video stream.

In the display apparatus 200 according to an embodiment of the disclosure, the decoding module 231 may be embodied by a decoder complying with MPEG, H.264, HEVC, or the like various compression standards.

The display apparatus 200 according to an embodiment of the disclosure, as shown in FIG. 3, includes a CNN 232 that processes a signal output from the decoding module 231.

The CNN 232 (hereinafter also referred to as a decoding neural network) refers to a kind of ANN based on convolution, which includes a plurality of channels and a plurality of layers and is used to analyze a visual image.

In the display apparatus 200 according to an embodiment of the disclosure, the CNN 232 may be embodied to apply various image processes to an image, and may for example decompress the video stream.

The CNN 232 may for example perform various decompression processes, such as a decompression process based on the size of an image, a compression process based on the number of bits corresponding to a pixel, etc., thereby outputting an image, the size of which is expanded to the original image of the input image.

According to an embodiment, each layer of the CNN 232 may be configured by a filter that operates with a parameter set to have a preset value, i.e. weight based on machine learning, deep learning, and the like previously performed learning. The CNN 232 may decompress an input video stream with the parameter set based on the learning as described above.

In the display apparatus 200 according to an embodiment of the disclosure, the CNN 232 is configured to operate as an on-device based AI.

According to an embodiment, the CNN 232 may operate as a resolution-raising extension module, i.e. a scaling-up module to raise a resolution of a video (or image). In other words, the CNN 232 may generate a high or super resolution image from a low resolution image by upscaling.

For example, the CNN 232 may be embodied as an AI scaler that makes a video signal decoded by the decoding module 231 be scaled up based on a predetermined AI learning-based process. Here, the AI scaler may be configured to scale up a video signal in accordance with the AI learning-based process used at the encoding terminal of the image providing apparatus 100, and may be configured to adjust a resolution of a video (or image) by processing a predetermined learning-based process, for example, machine learning or deep learning.

The display apparatus 200 may, as shown in FIG. 3, further include at least one of a preprocessing module 233 or the postprocessing module 234 to perform image compensation. Thus, the preprocessing or the postprocessing may be properly selected to perform the image compensation as necessary.

FIG. 3 shows an example that the display apparatus 200 includes both the preprocessing module 233 and the postprocessing module 234, but the disclosure is not limited to this example. According to an alternative example, the display apparatus 200 may include one of the preprocessing module 233 or the postprocessing module 234.

According to an embodiment of the disclosure, the display apparatus 200 may employ at least one of the preprocessing module 233 or the postprocessing module 234 to perform one or more image compensations based on learning about the decompression performed in the CNN 232. Thus, image quality is maintained by compensating for distortion of an image, which may occur while decompressing the image.

Here, the display apparatus 200 may decode a video stream received from the image providing apparatus 100, identify a flag indicating whether a predetermined image compensation should be performed (for example, whether the preprocessing or the postprocessing is on or off), and perform image compensation by at least one of the preprocessing module 233 or the postprocessing module 234 according to identification results. Thus, it is easy to identify whether the image compensation should be performed.

According to an embodiment, the display apparatus 200 finds a problem by learning the CNN 232 based on a predetermined algorithm, and uses at least one of the preprocessing module 233 or the postprocessing module 234 to perform the image compensation for the found problem.

There are no limits to the kinds of image compensation performed in the disclosure, and the image compensation may for example include at least one of dejagging, decontouring or deblurring. Thus, it is possible to properly compensate for various types of image distortion.

According to an embodiment, the display apparatus 200 may include the preprocessing module 233 to perform edge-deblurring, so that an edge of a decoded image can be compensated not to be sharp.

According to an alternative embodiment, the display apparatus 200 may include the postprocessing module 234 to perform the decontouring. Here, the postprocessing module 234 may remove a contour artifact which may occur while an image is decompressed in the CNN 232. The contour artifact to be removed in the postprocessing module 234 is identified or determined based on the previously performed learning.

In the display apparatus 200 according to an embodiment, it may be identified corresponding to the kind of image compensation whether to perform the preprocessing or the postprocessing. For example, the decontouring and the deblurring may be determined to be performed by the postprocessing module 234, and the edge deblurring may be determined to be performed by the preprocessing module 233.

According to an embodiment, the display apparatus 200 may include a hardware element, i.e. a video processor 230 (see FIG. 4), and the decoding module 231, the CNN 232, the preprocessing module 233 and the postprocessing module 234 described above may be provided as configurations of the video processor 230 and distinguished by operations based on execution of software.

According to an alternative embodiment, the decoding module 231, the CNN 232, the preprocessing module 233 and the postprocessing module 234 may be respectively embodied as hardware elements, or may be distinguished by combination of hardware and software as necessary.

The video processor may be embodied as a video board that various chipsets, memories, electronic parts, wiring and the like circuitry elements for performing the processes as described above are mounted onto a PCB.

The display apparatus 200 according to an embodiment of the disclosure may, as shown in FIG. 4, include a signal receiver 210, a communicator 220, a video processor 230, a display 240, a user input 250, a storage 260, and a controller 270. The signal receiver 210 may include a connector 211, and a tuner 212.

The elements included in the display apparatus 200 are not limited to the foregoing embodiment, but may exclude or change some elements or may include other additional elements.

The signal receiver 210 receives a signal from the outside. Here, the standards of the received signal may be varied depending on the types of the display apparatus 200. For example, the signal receiver 210 may receive a radio frequency (RF) signal from a broadcasting station (not shown) wirelessly, or may receive a signal complying with standards such as composite video, component video, super video, SCART, HDMI, DP, etc. by a wire.

The signal receiver 210 includes the connector 211 via which the display apparatus 200 connects with the external image source by a wire. According to an embodiment, an HDMI cable is used in connection between the connector 211 and the image source, but the connection standards are not limited to the HDMI.

The display apparatus 200 may receive a signal of content from a set-top box or the like image source connected by a wire through the connector 211. Here, the signal of the content includes a broadcast signal. The connector 211 basically receives a signal from the image source, but may interactively transmit and receive a signal.

The connector 211 may be embodied by a circuitry including a data input/output interface where communication modules (an S/W module, a chip, etc.), ports, etc. are combined corresponding to predetermined communication protocols.

According to an embodiment, an apparatus connected to the display apparatus 200 by a wire through the connector 211 is a set-top box or the like image source, but the disclosure is not limited to this embodiment. For example, a display apparatus 200 according to an alternative embodiment may connect with a mobile apparatus by a wire through the connector 211.

According to an embodiment, the signal receiver 210 may include the tuner 212 to be tuned to a channel corresponding to a broadcast signal when the received signal is the broadcast signal. The tuner 212 may include a demodulator that demodulates a broadcast signal of a certain tuned channel and outputs a signal in the form of a transport stream (TS). In other words, the tuner and the demodulator may be designed as an integrated single chip, or may be embodied as two separate chips, respectively.

According to an embodiment, the display apparatus 200 may receive a signal from various peripheral apparatuses. Further, the signal may be based on data received through the Internet or the like network. In this case, the display apparatus 200 may receive the signal through the communicator 220 (to be described later).

Further, the signal may be based on data stored in a nonvolatile storage 260 such as a flash memory, a hard disk drive (HDD), etc. The storage 260 may be provided inside or outside the display apparatus 200. In a case where the storage 260 is provided outside the display apparatus 200, the storage 260 may be connected to the display apparatus 200 through the connector 211.

The communicator 220 is configured to communicate with at least one external apparatus by a wire or wirelessly. The communicator 220 includes a wired and/or wireless communication module.

The communicator 220 may be embodied by a circuitry including communication modules (a S/W module, a chip, etc.) corresponding to predetermined communication protocols.

According to an embodiment, the communicator 220 includes a wireless local area network (WLAN) unit. The WLAN unit may perform wireless communication with at least one external apparatus through an access point (AP) under control of the controller 270. The WLAN unit includes Wi-Fi communication module.

According to an embodiment, the communicator 220 includes at least one of modules for short-range communication such as Bluetooth, Bluetooth low energy, RF communication, Wi-Fi Direct, Zigbee, ultrawideband (UWB), near field communication (NFC), infrared data association (IrDA) communication, etc. The short-range communication module is configured to directly support wireless communication between the display apparatus 200 and at least one external apparatus without the AP.

According to an embodiment, the communicator 220 may further include a wired communication module such as Ethernet, etc.

The communicator 220 of the display apparatus 200 according to an embodiment of the disclosure may be embodied by one among the WLAN unit, the short-range communication module, and the wired communication module or combination of two among them according to required performance.

The video processor (also referred to as an image processor) 230 performs various preset image processes with regard to a video signal (or image signal). The video processor 230 outputs an output signal, which is generated or combined by performing such image processes, to the display 240, so that the display 240 can display an image based on the video signal.

The kinds of processes performed by the video processor 230 in the display apparatus 200 of the disclosure are not limited to those described with reference to FIG. 3, and the video processor 230 may for example further include at least one module for performing various processes such as de-interlacing for converting an interlaced type broadcast signal into a progressive type broadcast signal, noise reduction for enhancing image quality, detail enhancement, frame refresh rate conversion, line scanning, etc.

The video processor 230 may be embodied in the form of a group of individual elements, i.e. modules for independently performing such processes, or may be embodied as included in a main system-on-chip (SoC) where many functions are integrated. The main SoC may further include a microprocessor or CPU embodied as an example of the controller 270.

According to an embodiment, the video processor 230 may be embodied by an image board that various chipsets, a memory, electronic parts, wiring, and the like circuit configuration for performing such processes are mounted to a PCB. In this case, the display apparatus 200 may include a single image board on which the tuner, the video processor 230, and the controller 270 are provided. Of course, this is merely an example.

Alternatively, the tuner, the video processor, and the controller may be provided on a plurality of PCBs connected for communication with each other.

The video signal processed by the video processor 230 is output to the display 240. The display 240 displays a video (or image) corresponding to a video signal received from the video processor 230.

There are no limits to the type of the display 240. For example, the display 240 may be achieved by various display types such as liquid crystal, plasma, a light-emitting diode, an organic light-emitting diode, a surface-conduction electron-emitter, a carbon nano-tube, nano-crystal, etc. According to an embodiment, the display 240 includes a display panel for displaying an image, and may further include an additional configuration, e.g. a driver according to the types.

The user input 250 is installed in a certain area on the front or lateral side of the display apparatus 200, and embodied as a keypad (or input panel) with a power key, a menu key, and the like buttons, thereby receiving a user's input.

According to an embodiment, the user input may further include an input device (for example, a remote controller, a mouse, a keyboard, a smartphone with an application capable of remotely controlling the display apparatus 200, etc.) that generates a preset command/data/information/signal for remotely controlling the display apparatus 200 and transmits it to the display apparatus 200, or a sound input unit such as a microphone to receive a voice uttered by a user/a sound. The display apparatus 200 may receive a signal corresponding to a user's input from a remote input device through the communicator 220.

The storage 260 may be configured to store various pieces of data of the display apparatus 200. The storage 260 may be embodied by a nonvolatile memory (or a writable ROM) which can retain data even though the display apparatus 200 is powered off, and mirror changes. That is, the storage 260 may include at least one among a hard disk drive (HDD), a flash memory, an electrically programmable ROM (EPROM) or an electrically erasable and programmable ROM (EEPROM).

The storage 260 may further include a volatile memory such as a random access memory (RAM), and the volatile memory may be provided as a dynamic RAM (DRAM) or static RAM (SRAM), of which reading or writing speed for the display apparatus 200 is faster than that of the nonvolatile memory. In other words, a term 'storage' in the disclosure is defined to include not only the nonvolatile memory but also the volatile memory, a cache memory provided in the controller 270, etc.

Data stored in the storage 260 may for example include not only an operating system (OS) for driving the display apparatus 200 but also various applications, image data, appended data, etc. executable on the OS.

Specifically, the storage 260 may be configured to store a signal or data input/output corresponding to operation of elements under control of the controller 270. The storage 260 may be configured to store a program for controlling the display apparatus 200, a UI related to an application provided by a manufacturer or downloaded from the outside, images for providing the UI, user information, documents, databases, or relevant data. Here, the application stored in the storage 260 may include a machine-learning application or deep-learning application that operates based on a previously performed learning.

According to an embodiment, the storage 260 is configured to further include learning data for making the video processor 230 perform operation using a filter set with a value based on previously performed learning, and learning data for finding a problem of the CNN 232. The video processor 230 may use a learning algorithm model based on the learning data stored in the storage 260 to carry out the operation.

The display apparatus 200 according to an embodiment of the disclosure is embodied to operate as AI in an on-device environment, thereby carrying out learning based on the data of the storage 260 autonomously embedded in the apparatus ad the operation using the algorithm model corresponding to the learning.

The controller 270 performs control to operate general elements of the display apparatus 200. The controller 270 includes at least one universal processor that loads at least a part of a control program from a nonvolatile memory, in which a control program is installed, to a volatile memory, and executes the loaded control program, and may for example be embodied by a CPU, an application processor (AP), or a microprocessor.

The controller 270 may include at least one processor with one or more cores among a single core, a dual core, a triple core, a quad core, or the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus.

According to an embodiment, the controller 270 may further include a graphic processing unit (GPU) for graphic-processing.

According to an embodiment, the controller 270 may be embodied as included in the main SoC mounted to the PCB internally provided in the display apparatus 200. Alternatively, the main SoC may further include the video processor 230 for processing a video signal.

The control program may include a program(s) achieved by at least one of a basic input/output system (BIOS), a device driver, an OS, a firmware, a platform, or an application. According to an exemplary embodiment, the application may be previously installed or stored in the display apparatus 200 when the display apparatus 200 is manufactured, or may be installed in the display apparatus 200 on the basis of application data received from the outside when it is required in the future. The application data may for example be downloaded from an external server such as an application market to the display apparatus 200. Such an external server is merely an example of the computer program product according to the disclosure, but not limited thereto.

According to an embodiment, the operation of the controller 270 may be embodied by a computer program stored in the computer program product (not shown) provided separately from the display apparatus 200.

In this case, the computer program product includes a memory in which an instruction corresponding to a computer program is stored, and a processor. When the instruction is issued by the processor, operation may be carried out to decode an encoded video stream, decompress the video stream with a parameter set based on learning, and perform image compensation based on the learning about the decompression with regard to the video stream. Here, the processor issuing the instruction may include the processor (e.g. the CPU) of the controller 270 or the video processor 230.

That is, according to an embodiment of the disclosure, the video processor 230 given as the hardware configurations processes the data of the video stream by way of example. However, the disclosure is not limited to this embodiment. In other words, according to an embodiment of the disclosure, the data of the video stream may be processed by the software configuration of the controller 270.

Accordingly, the display apparatus 200 downloads and executes the computer program stored in a separate computer program product and performs the operation of at least one among the controller 270, or the video processor 230.

Further, according to an embodiment, the operation of the controller 270 may be carried out by a computer-readable program stored in the recording medium. The program, i.e. data stored in the recording medium may be directly accessed and executed by the controller 270, or downloaded into the display apparatus 200 via a transmission medium embodied by a wired/wireless network in which the computer systems are connected to one another and executed, thereby carrying out operation.

At least one among the foregoing configurations involved in the controller 270 may be embodied by a hardware module or a computer program described as above. Below, it will be described by way of example that the operations of processing the data of the video stream are carried out by the video processor 230 of the display apparatus 200. However, it will be appreciated that such operations are carried out by the processor of the controller 270 such as the CPU or by combination of the audio processor 150 and the processor of the controller 270 as necessary.

Below, a procedure of finding a problem of a neural network and processing a video signal based on AI learning according to an embodiment of the disclosure will be described with reference to the accompanying drawings.

Figure 5:
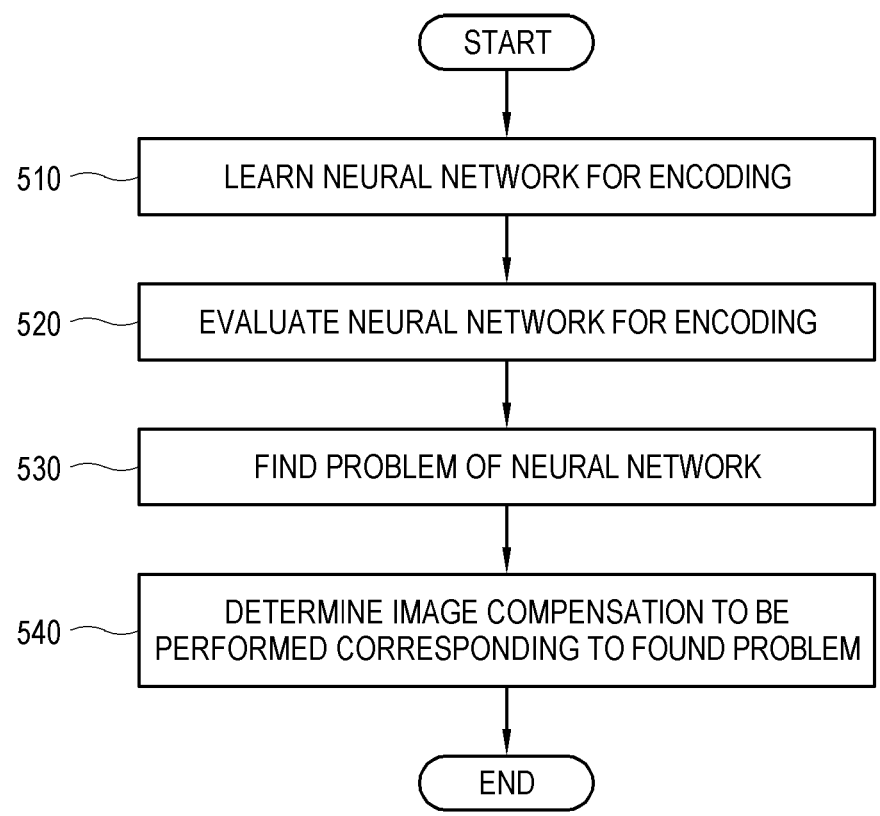
FIG. 5 is a flowchart of finding a problem of an encoding neural network in an image providing apparatus according to an embodiment of the disclosure.

FIG. 5 is a flowchart of finding a problem of an encoding neural network in an image providing apparatus according to an embodiment of the disclosure.

As shown in FIG. 5, the video processor of the image providing apparatus 100 performs training as learning about the encoding neural network, i.e. the CNN 132 configured with a predetermined number of channels and layers (510). The image providing apparatus 100 may identify parameters for operating the encoding neural network 132 through the learning of the operation 510.

The video processor of the image providing apparatus 100 evaluates output performance of the encoding neural network 132 with regard to a predetermined input image, based on the learning of the operation 510 (520). Here, an image not used for the learning of the operation 510 may be used as an input image for the output evaluation.

The image providing apparatus 100 adjusts the configurations of the encoding neural network 132 based on evaluation results in the operation 520, and then performs the learning of the operation 510 again, thereby evaluating the output performance of the operation 520 again.

The video processor of the image providing apparatus 100 repetitively performs the learning and evaluating operations 510 and 520 by adjusting the configurations of the encoding neural network 132 through such repetitive inference processes, thereby identifying a final configuration of the CNN 132. In addition, the output performance of the finally configured encoding neural network 132 is finally evaluated. Thus, a problem found by inference based on repetitive learning is solvable through image compensation.

As described above, the image providing apparatus 100 finds a problem of the encoding neural network 132 based on the final evaluation results (530). Here, the found problem may for example be shown as a specific image pattern such as a jagging phenomenon of a line in an image.

In addition, the image providing apparatus 100 determines at least one of the preprocessing module 133 or the postprocessing module 134 of the video processor to perform image compensation for the problem found in the operation 530 (540). In other words, the determination is made to perform at least one of the preprocessing or the postprocessing of the video processor with regard to an input image.

Here, the video processor may identify whether to make each of the preprocessing module 133 and the postprocessing module 134 perform the image compensation, and identify the kind of image compensation to be performed. For example, when a problem of a specific pattern such as a jagging phenomenon is found in the operation 530, whether to make each of the preprocessing module 133 and the postprocessing module 134 perform the image compensation may be identified, and the kind of image compensation to be performed may be identified in such a manner that the preprocessing module 133 makes noise to compensate for the corresponding pattern.

According to an embodiment, the image providing apparatus 100 performs the operations 510 to 540 with respect to an input image having various features, thereby identifying whether to make each of the preprocessing module 133 and the postprocessing module 134 perform the image compensation, and identifying the kind of image compensation to be performed, in accordance with the features of the input image.

Figure 6:
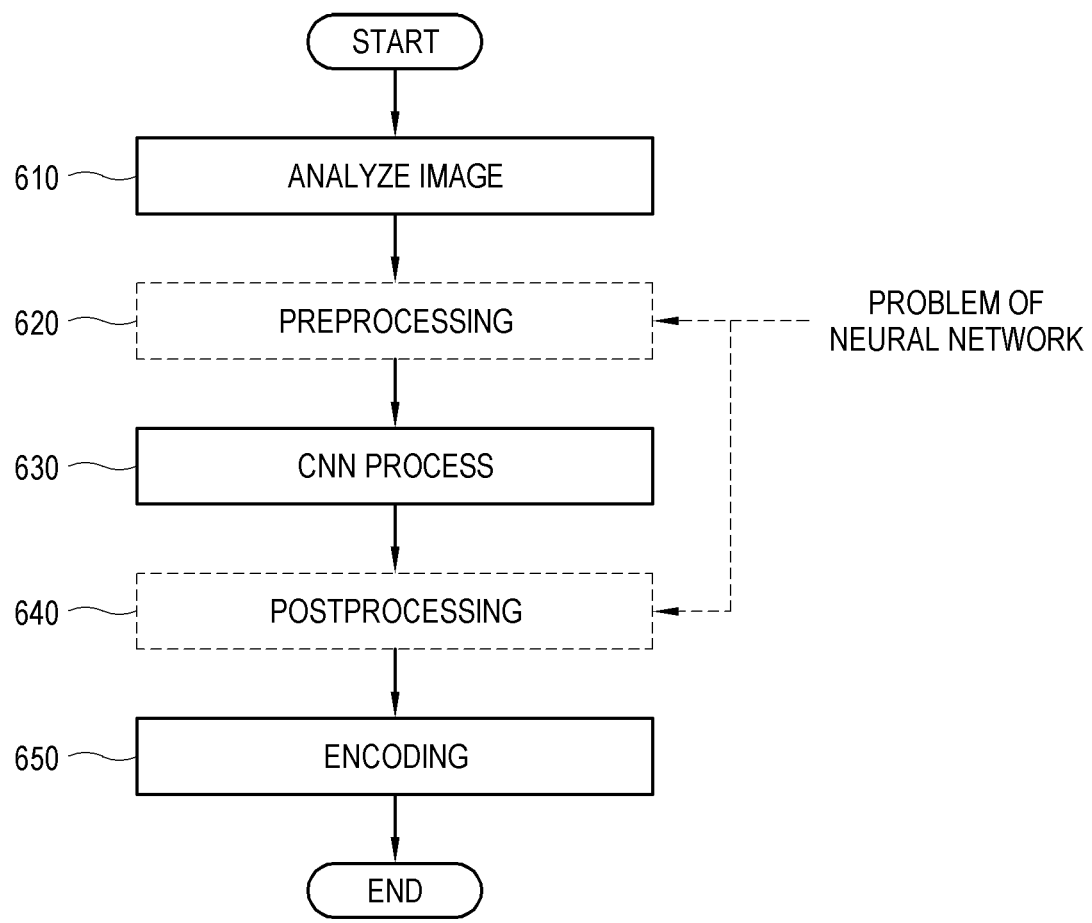
FIG. 6 is a flowchart of processing an image in an image providing apparatus according to an embodiment of the disclosure.

FIG. 6 is a flowchart of processing an image in an image providing apparatus according to an embodiment of the disclosure.

As shown in FIG. 6, the video processor of the image providing apparatus 100 analyzes an input image to be encoded (610). The image providing apparatus 100 identifies the features (or attributes) of the input image based on image analysis results of the operation 610, and identifies whether to perform the preprocessing or the postprocessing for the input image and the kind of image compensation based on the identified features. That is, one or both of the preprocessing of the operation 620 and the postprocessing of the operation 640 (to be described later) may be performed based on the foregoing identification results.

Here, the image providing apparatus 100 may identify whether to perform the preprocessing or the postprocessing with respect to one among a frame unit, a block unit and a pixel unit of an image.

When it is identified in the operation 610 to perform the preprocessing, the preprocessing module 133 of the video processor performs the preprocessing, i.e. the image compensation with regard to the input image (620). Here, the kind of image compensation to be performed may include image compensation that makes noise to compensate for a problem of a neural network, e.g. a pattern corresponding to a jagging phenomenon or the like specific pattern found in the operation 530 of FIG. 5.

The video processor of the image providing apparatus 100 performs the process of the CNN 132 with respect to the input image (630). Here, the video processor forms each layer of the CNN 132 and compresses an input image through a filter of which a parameter is set with a value based on the previously performed learning.

When it is identified in the operation 610 to perform the preprocessing, the video processor may perform the process of the CNN 132 with regard to the input image subjected to the preprocessing in the operation 620. When it is identified in the operation 610 not to perform the preprocessing, the video processor may perform the process of the CNN 132 with regard to the input image to be subjected to the analysis of the operation 610.

When it is identified in the operation 610 to perform the postprocessing, the postprocessing module 134 of the video processor performs the postprocessing, i.e. the image compensation with regard to the image output from the CNN 132 in the operation 630 (640). Here, the kind of image compensation to be performed may include image compensation that makes noise to previously prevent a problem of a neural network, e.g. a contour artifact, which may occur while the compressed image is restored, found in the operation 530 of FIG. 5.

In addition, the encoding module 131 of the video processor encodes the input image to thereby output a video stream (650).

When it is identified in the operation 610 to perform the postprocessing, the video processor may encode the input image subjected to the postprocessing in the operation 640. When it is identified in the operation 610 not to perform the postprocessing, the video processor may encode the input image compressed by the CNN 132 in the operation 630.

As described above, the image providing apparatus 100 according to an embodiment of the disclosure finds a problem, which may occur during the compression process of the CNN 132 operating with a parameter set based on the previously performed learning, based on learning, and compensates for the found problem by at least one of the preprocessing or the postprocessing of the CNN 132. Therefore, it is possible to provide a high-quality image without lowering performance even in a neural network structure where enough channels and layers are not ensured because of restricted resources in an on-device environment.

Figure 7:
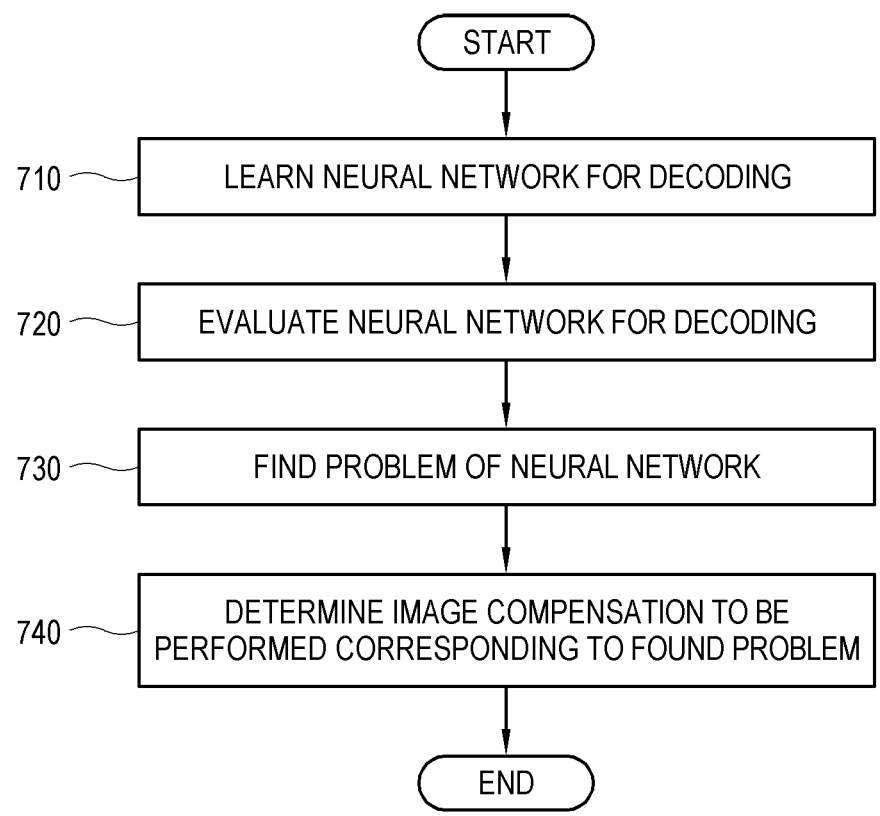
FIG. 7 is a flowchart of finding a problem of a decoding neural network in a display apparatus according to an embodiment of the disclosure.

FIG. 7 is a flowchart of finding a problem of a decoding neural network in a display apparatus according to an embodiment of the disclosure.

As shown in FIG. 7, the video processor 230 of the display apparatus 200 performs training as learning about the decoding neural network i.e. the CNN 232 including a predetermined number of channels and layers (710). The display apparatus 200 may identify parameters for operation of the decoding neural network 232 based on the learning in the operation 710.

The video processor of the display apparatus 200 evaluates the output performance of the decoding neural network 232 with regard to a predetermined input image, based on the learning of the operation 710 (720). Here, an image not used in the learning of the operation 710 may be used in the input image for evaluating the output performance.

The display apparatus 200 adjusts the configuration of the decoding neural network 232 based on the evaluation results of the operation 720, and performs the learning of the operation 710 again, thereby evaluating the output performance of the operation 720 again.

The video processor 230 of the display apparatus 200 repetitively performs the learning and evaluating operations 710 and 720 by adjusting the configurations of the decoding neural network 232 through such repetitive inference processes, thereby identifying a final configuration of the CNN 232. In addition, the output performance of the finally configured decoding neural network 232 is finally evaluated. Thus, a problem found by inference based on repetitive learning is solvable through image compensation.

As described above, the display apparatus 200 finds a problem of the decoding neural network 232 based on the final evaluation results (730). Here, the found problem may for example be shown as a specific image pattern such as a jagging phenomenon of a line in an image.

In addition, the display apparatus 200 determines at least one of the preprocessing module 233 or the postprocessing module 234 of the video processor 230 to perform image compensation for the problem found in the operation 730 (740). In other words, the determination is made to perform at least one of the preprocessing or the postprocessing of the video processor 230 with regard to an input image.

Here, the video processor 230 may identify whether to make each of the preprocessing module 233 and the postprocessing module 234 perform the image compensation, and identify the kind of image compensation to be performed. For example, when a problem of a specific pattern such as a jagging phenomenon is found in the operation 730, whether to make each of the preprocessing module 233 and the postprocessing module 234 perform the image compensation may be identified, and the kind of image compensation to be performed may be identified in such a manner that the preprocessing module 233 makes noise to compensate for the corresponding pattern.

According to an embodiment, the display apparatus 200 performs the operations 710 to 740 with respect to an input image having various features, thereby identifying whether to make each of the preprocessing module 233 and the postprocessing module 234 perform the image compensation, and identifying the kind of image compensation to be performed, in accordance with the features of the input image.

According to an embodiment, the display apparatus 200 performs the operations 710 to 740 with respect to an input image having various features, thereby identifying whether to make each of the preprocessing module 233 and the postprocessing module 234 perform the image compensation, and identifying the kind of image compensation to be performed, in accordance with the features of the input image. Therefore, efficient compensation is performed corresponding to features of an image.

Figure 8:
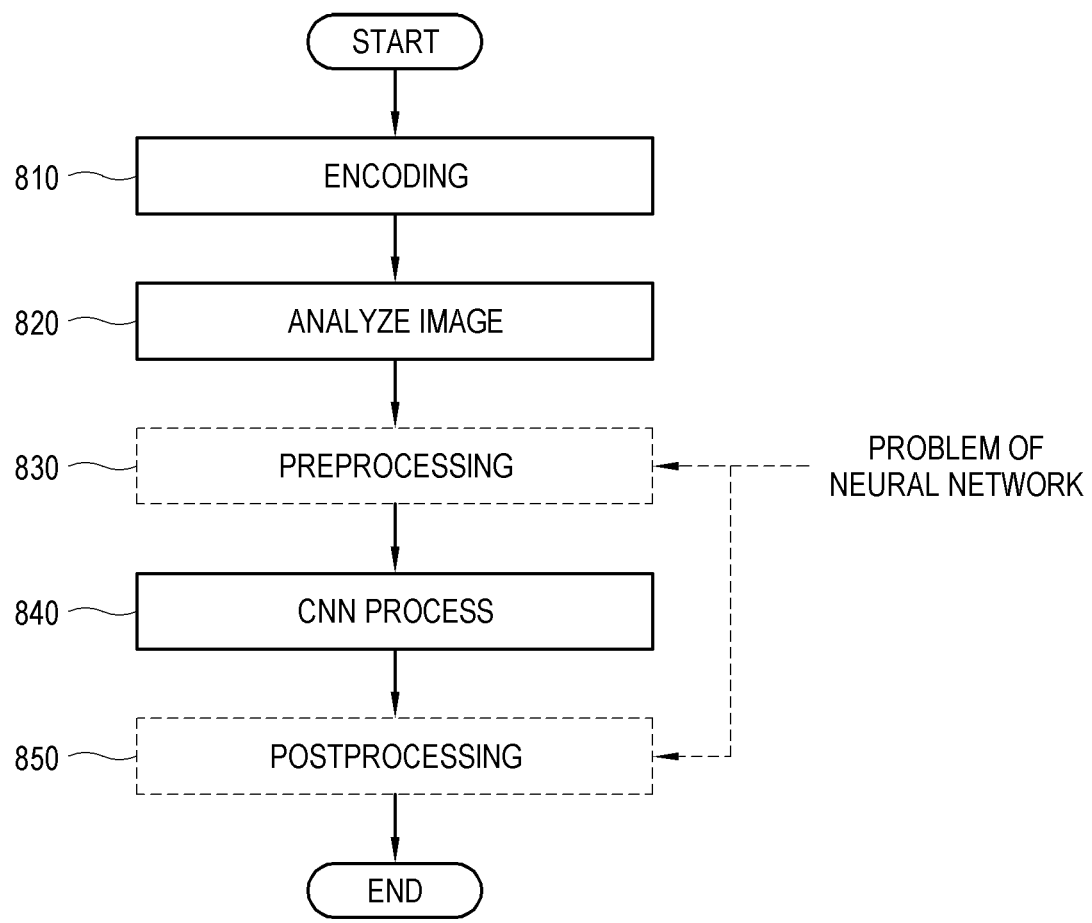
FIG. 8 is a flowchart of processing an image in a display apparatus according to an embodiment of the disclosure.

FIG. 8 is a flowchart of processing an image in a display apparatus according to an embodiment of the disclosure.

As shown in FIG. 8, the decoding module 231 of the video processor 230 of the display apparatus 200 decodes a video stream received from the image providing apparatus 100 (810).

The video processor 230 of the display apparatus 200 analyzes an input image decoded in the operation 810 (820). The display apparatus 200 identifies the features (or attributes) of the input image based on image analysis results of the operation 820, and identifies whether to perform the preprocessing or the postprocessing for the input image and the kind of image compensation based on the identified features. That is, one or both of the preprocessing of the operation 830 and the postprocessing of the operation 850 (to be described later) may be performed based on the foregoing identification results.

Here, the display apparatus 200 may identify whether to perform the preprocessing or the postprocessing with respect to one among a frame unit, a block unit and a pixel unit of an image.

When it is identified in the operation 820 to perform the preprocessing, the preprocessing module 233 of the video processor 230 performs the preprocessing, i.e. the image compensation with regard to the input image (830). Here, the kind of image compensation to be performed may include image compensation that performs dejagging to remove jagging corresponding to a problem of a neural network, e.g. a jagging phenomenon or the like specific pattern, found in the operation 730 of FIG. 7.

The video processor 230 of the display apparatus 200 performs the process of the CNN 232 with respect to the input image (840). Here, the video processor 230 forms each layer of the CNN 232 and decompresses the input image through a filter of which a parameter is set with a value based on the previously performed learning.

When it is identified in the operation 820 to perform the preprocessing, the video processor 230 may perform the process of the CNN 232 with regard to the input image subjected to the preprocessing in the operation 830. When it is identified in the operation 820 not to perform the preprocessing, the video processor 230 may perform the process of the CNN 232 with regard to the input image to be subjected to the analysis of the operation 820.

When it is identified in the operation 820 to perform the postprocessing, the postprocessing module 234 of the video processor 230 performs the postprocessing, i.e. the image compensation with regard to the image output from the CNN 232 in the operation 830 (850). Here, the kind of image compensation to be performed may include image compensation as decontouring to remove a problem of a neural network, e.g. a contour artifact, which may occur while the compressed image is restored, found in the operation 730 of FIG. 7. In addition, the image subjected to the decoding, the decompression and the image compensation through the foregoing processes is displayed on the display 240.

When it is identified in the operation 820 not to perform the postprocessing, the video processor 230 processes the image decompressed in the operation 840 to be displayed on the display 240.

As described above, the display apparatus 200 according to an embodiment of the disclosure finds a problem, which may occur during the decompression process of the CNN 232 operating with a parameter set based on the previously performed learning, based on learning, and compensates for the found problem by at least one of the preprocessing or the postprocessing of the CNN 232. Therefore, it is possible to display a high-quality image without lowering performance even in a neural network structure where enough channels and layers are not ensured because of restricted resources in an on-device environment.

As described above, according to the disclosure, there are provided a display apparatus, an image providing apparatus, and methods of controlling the same, in which distortion that may occur while an image is processed based on AI learning is predicted and compensated, thereby maintaining high reliability of an output even in an on-device environment where resources are restricted.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display; and
   a processor configured to:
   decode an encoded video stream through a decoding module, wherein the decoded video stream comprises a first image,
   decompress the decoded video stream through a neural network, wherein the neural network comprises a plurality of channels and a plurality of layers, the neural network is configured to operate with a parameter set, and the parameter set is identified based on a learning operation about the neural network, wherein an output performance of the neural network with regard to another input image is evaluated based on the learning operation and a configuration of the neural network is changeable based on an evaluation result on the output performance of the neural network to identify a final configuration, and
   perform a function corresponding to an image compensation through at least one of a preprocessing module connected to a front-end of the neural network or a postprocessing module connected to a back-end of the neural network, wherein the image compensation is identified based on a problem of the neural network, the problem of the neural network corresponding to a predetermined image pattern with regard to the neural network with the final configuration changed based on a final evaluation result on the output performance of the neural network, and
   wherein the decoding module, the preprocessing module, the neural network and the postprocessing module are configured to connected serially so that the video stream passes sequentially to output the first image, and the image compensation based on the problem of the neural network is pre-processed by the preprocessing module or post-processed by the postprocessing module.

2. The display apparatus according to claim 1, wherein the image compensation is at least one of preprocessing performed through the preprocessing module or postprocessing performed through the postprocessing module.

3. The display apparatus according to claim 2, wherein the processor is further configured to:
   identify features of the first image, and
   determine whether to perform the preprocessing or the postprocessing with regard to the first image based on the identified features.

4. The display apparatus according to claim 2, wherein the processor is further configured to:
   obtain, from the decoded video stream, a flag, wherein the flag is configured to indicate whether the preprocessing or the postprocessing is to be performed.

5. The display apparatus according to claim 2, wherein the processor is further configured to determine whether to perform the preprocessing or the postprocessing, based on one among a frame unit, a block unit and a pixel unit of the first image.

6. The display apparatus according to claim 1, wherein the image compensation comprises at least one of dejagging, decontouring, or deblurring corresponding to the predetermined image pattern.

7. An image providing apparatus comprising:
   a processor configured to:
   compress an input image through a neural network, wherein the neural network comprises a plurality of channels and a plurality of layers, the neural network is configured to operate with a parameter set, and the parameter set is identified based on a learning operation about the neural network, wherein an output performance of the neural network with regard to another input image is evaluated based on the learning operation and a configuration of the neural network is changeable based on an evaluation result on the output performance of the neural network to identify a final configuration,
   perform a function corresponding to an image compensation through at least one of a preprocessing module connected to a front-end of the neural network or a postprocessing module connected to a back-end of the neural network, wherein the image compensation is identified based on a problem of the neural network, the problem of the neural network corresponding to a predetermined image pattern with regard to the neural network with the final configuration changed based on a final evaluation result on the output performance of the neural network, and
   generate an encoded video stream through an encoding module configured to encode the input image compressed and compensated; and
   data interface circuitry configured to output the encoded video stream, and
   wherein the preprocessing module, the neural network, the postprocessing module and the encoding module are configured to connected serially so that the input image passes sequentially to output the encoded video stream, and the image compensation based on the problem of the neural network is pre-processed by the preprocessing module or post-processed by the postprocessing module.

8. The image providing apparatus according to claim 7, wherein the image compensation is at least one of preprocessing performed through the preprocessing module or postprocessing performed through the postprocessing module.

9. The image providing apparatus according to claim 7, wherein the encoded video stream comprises a flag indicating whether second preprocessing or second postprocessing is to be performed in a display apparatus configured to decode the encoded video stream.

10. The image providing apparatus according to claim 7, wherein the image compensation comprises noise making corresponding to the predetermined image pattern, and the noise making is configured to compensate for at least one of jagging, contouring, or blurring.

11. A method of controlling a display apparatus, the method comprising:
   decoding an encoded video stream through a decoding module, wherein the decoded video stream includes a first image;
   decompressing the decoded video stream through a neural network, wherein the neural network comprises a plurality of channels and a plurality of layers, the neural network is configured to operate with a parameter set, and the parameter set is identified based on a learning operation about the neural network, wherein an output performance of the neural network with regard to another input image is evaluated based on the learning operation and a configuration of the neural network is changeable based on an evaluation result on the output performance of the neural network to identify a final configuration; and performing a function corresponding to an image compensation through at least one of a preprocessing module connected to a front-end of the neural network or a postprocessing module connected to a back-end of the neural network, wherein the image compensation is identified based on a problem of the neural network, the problem of the neural network corresponding to a predetermined image pattern with regard to the neural network with the final configuration changed based on a final evaluation result on the output performance of the neural network, and wherein the decoding module, the preprocessing module, the neural network and the postprocessing module are configured to connected serially so that the video stream passes sequentially to output the first image, and the image compensation based on the problem of the neural network is pre-processed by the preprocessing module or post-processed by the postprocessing module.

12. The method according to claim 11, wherein the image compensation is at least one of preprocessing performed through the preprocessing module or postprocessing performed through the postprocessing module.

13. The method according to claim 12, further comprising:
identifying features of the first image; and
determining whether to perform the preprocessing or the postprocessing with regard to the first image based on the identified features.

14. The method according to claim 12, further comprising:
obtaining, from the decoded video stream, a flag, wherein the flag is configured to indicate whether the preprocessing or the postprocessing is to be performed.

15. The method according to claim 11, wherein the image compensation comprises at least one of dejagging, decontouring, or deblurring corresponding to the predetermined image pattern.

16. A method of controlling an image providing apparatus, the method comprising:

compressing an input image through a neural network, wherein the neural network comprises a plurality of channels and a plurality of layers, the neural network is configured to operate with a plurality of parameters, and the plurality of parameters are identified based on a learning operation about the neural network, wherein an output performance of the neural network with regard to another input image is evaluated based on the learning operation and a configuration of the neural network is changeable based on an evaluation result on the output performance of the neural network to identify a final configuration;

performing a function corresponding to an image compensation through at least one of a preprocessing module connected to a front-end of the neural network or a postprocessing module connected to a back-end of the neural network, wherein the image compensation is identified based on a problem of the neural network, the problem of the neural network corresponding to a predetermined image pattern with regard to the neural network with the final configuration changed based on a final evaluation result on the output performance of the neural network;

generating an encoded video stream through an encoding module configured to encode the input image compressed and compensated; and outputting the encoded video stream, and wherein the preprocessing module, the neural network, the postprocessing module and the encoding module are configured to connected serially so that the input image passes sequentially to output the encoded video stream, and the image compensation based on the problem of the neural network is pre-processed by the preprocessing module or post-processed by the postprocessing module.

17. The method according to claim 16, wherein the image compensation is at least one of preprocessing or postprocessing performed through the preprocessing module or postprocessing performed through the postprocessing module.

18. The method according to claim 16, wherein the performing of the image compensation comprises making noise corresponding to the predetermined image pattern, and wherein the noise making is configured to compensate for at least one of jagging, contouring, or blurring.

* * * * *